United States Patent Office 3,441,049
Patented Apr. 29, 1969

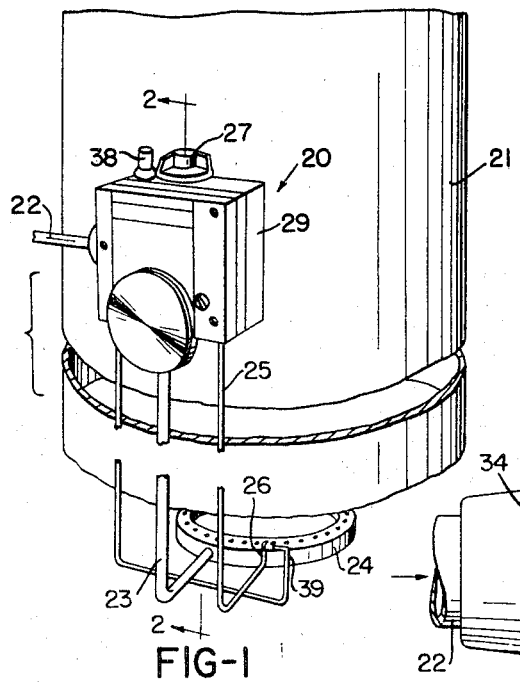

3,441,049
CARTRIDGE TYPE PRESSURE REGULATOR
Michael John Caparone, Arcadia, and Theodore John Dykzeul, Rolling Hills, Calif., assignors to Robertshaw Controls Company, Richmond, Va., a corporation of Delaware
Original application Aug. 6, 1962, Ser. No. 214,903. Divided and this application Oct. 22, 1965, Ser. No. 509,675
Int. Cl. F16k 25/00, 31/12; F16f 9/10
U.S. Cl. 137—454.6         11 Claims

ABSTRACT OF THE DISCLOSURE

This disclosure relates to a self-contained pressure regulator that can be readily disposed in a housing means against a surface thereof having an inlet and an outlet respectively disposed in fluid communication with an inlet means and an outlet means of the pressure regulator, the pressure regulator comprising a cup-shaped casing having its closed end provided with its inlet means and outlet means and having its opened end turned over to secure a flexible diaphragm thereto that cooperates with the casing to define a chamber that is in fluid communication with the inlet means and outlet means thereof while carrying a valve member that controls the inlet means thereof.

---

This application is a Divisional patent application of the parent copending patent application, Ser. No. 214,-903, filed Aug. 6, 1962, and now abandoned.

This invention relates to an improved control device for a water heater tank and the like as well as to an improved pressure regulator for such a control device or the like.

Further, this invention relates to an improved method of making and adjusting such a pressure regulator or the like.

Heretofore, various control devices have been provided for domestic water heater tanks and the like to control the heating thereof.

For example, one such prior known control device includes a housing means to receive fuel, such as gas or the like, from a source thereof, and having means to selectively direct the fuel to a pilot burner means and a main burner means, the pilot burner means having a continuously burning flame for igniting fuel issuing from the main burner means in an intermittent operation thereof and the main burner means being utilized to heat the water in the tank to tend to maintain the water at a constant temperature regardless of the amount of heated water drawn from the tank.

Such a prior known control device has a thermostatically operated valve means interconnecting the source of fuel with the main burner means whereby the thermostatic means senses the temperature of the water in the tank and opens the valve means when the temperature of the water falls below a selected temperature to cause the main burner means to heat the water tank up to the selected temperature whereby the thermostatic means closes the valve means to terminate the operation of the main burner means.

However, it has been found that in such a prior known control device, not only must a separate adjustment be made on a pressure regulating means of the control device to effect proper flame characteristics of the pilot burner means, but also a separate adjustment must be made on the "C" valve or gas cock to select the proper burner input for a various capacity appliance.

According to the teachings of this invention, however, a separate pressure regulator is provided for the pilot burner means whereby an initial adjustment of the pressure regulator will permit the fuel to issue from the pilot burner means at a substantially constant rate regardless of variations in the input pressure of the fuel as well as the intermittent operation of the main burner means.

Thus, when the pilot burner pressure regulator of this invention is utilized in combination with a separate pressure regulator for the main burner means, the need for either the pilot or main burner C valve adjustments, other than proper orificing of the pilot and main burner means for the various capacities at the set regulated gas pressures, are eliminated. The elimination of these commonly required adjustments is a convenience of commercial importance both to the appliance manufacturer and the user.

Thus, it can be seen, that the pilot gas pressure regulator of this invention replaces the pilot adjusting key of prior known control devices. The pressure regulation of the pilot gas allows the usage of a wide variety of pilots with different capacity requirements without requiring separate adjustment for each pilot or type of pilot as previously required with the pilot adjusting key. This is of considerable commercial importance from both the standpoint of eliminating the need for initial adjustment and automatic compensation for varying supply pressures.

Separate pressure regulators for the main gas pressure regulation and the pilot gas pressure regulation gives the customer a choice of either or both types of pressure regulation. The separation of pressure regulation for the main gas and pilot gas through the use of separate and distinct pressure regulators for each purpose avoids the pilot starving effect experienced in some applications where a single pressure regulator is required to regulate both the main gas and the pilot gas supply. In the case of the control utilizing both the main gas regulator and the pilot gas regulator of this invention, an extremely wide application is possible both in respect to main burner capacity and pilot burner capacity without any control adjustment being necessary. With nonregulated controls, adjustments, such as a C valve adjustment for main gas supply as well as pilot key adjustments, have been required. In addition, after such adjustments were made there was no assurance that supply pressures would not vary to the extent that the original adjustments became improper. With separate main gas and pilot gas regulation, the problem of initial adjustments of this type and subsequent readjustments being required is essentially eliminated.

Accordingly, it is an object of this invention to provide an improved control device having one or more of the novel features of this invention set forth above and hereinafter shown or described.

Another object of this invention is to provide an improved pressure regulator for such a control device or the like.

A further object of this invention is to provide an improved method for making such a pressure regulator or the like.

Another object of this invention is to provide an improved means for adjusting the pressure setting of such a pressure regulator or the like.

Other objects, uses and advantages of this invention are apparent from a reading of this description which proceeds with reference to the accompanying drawings forming a part thereof and wherein:

FIGURE 1 is a broken-away, fragmentary, perspective view illustrating the improved control device of this invention in combination with a water heater or the like.

FIGURE 2 is a fragmentary, cross-sectional view taken substantially on line 2—2 of FIGURE 1.

3

FIGURE 3 is an enlarged, partially broken-away, front view of the control device illustrated in FIGURE 1.

FIGURE 4 is a cross-sectional view of the control device illustrated in FIGURE 3 and is taken on line 4—4 thereof.

Figure 5:
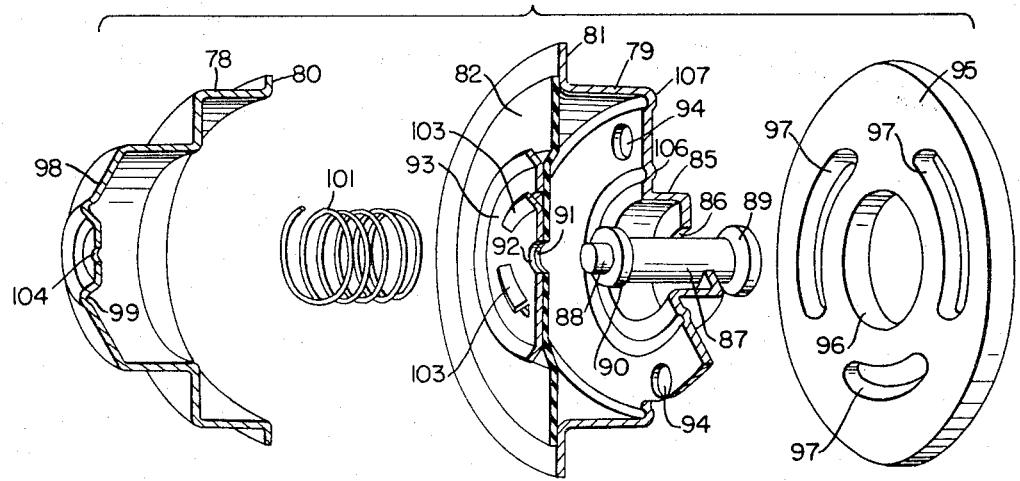

FIGURE 5 is an enlarged, exploded, perspective view of the pressure regulator of this invention.

Figure 6:
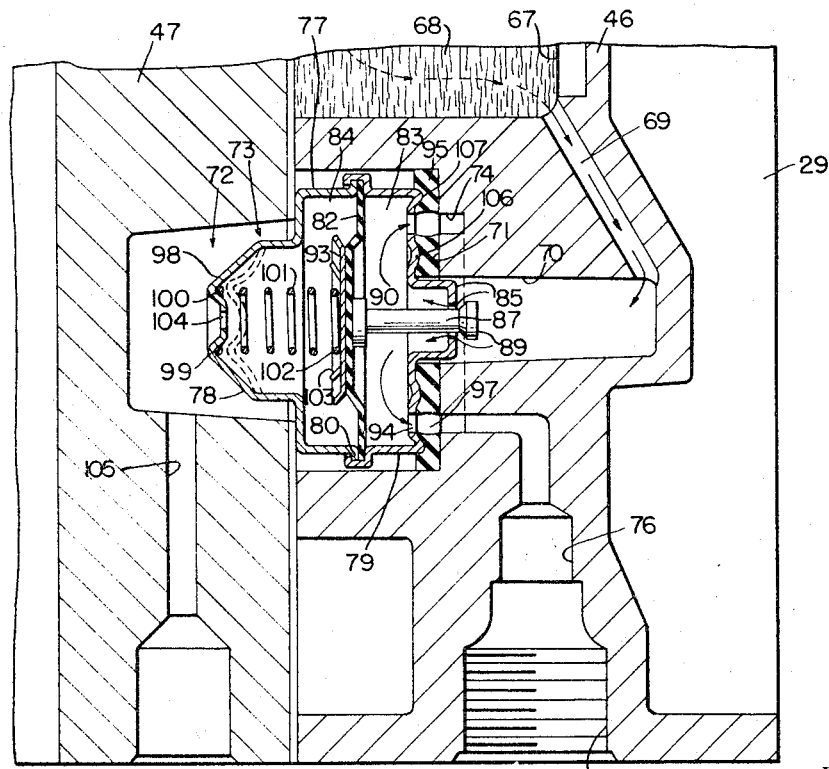

FIGURE 6 is an enlarged, fragmentary, cross-sectional view taken substantially on line 6—6 of FIGURE 3.

Figure 7:
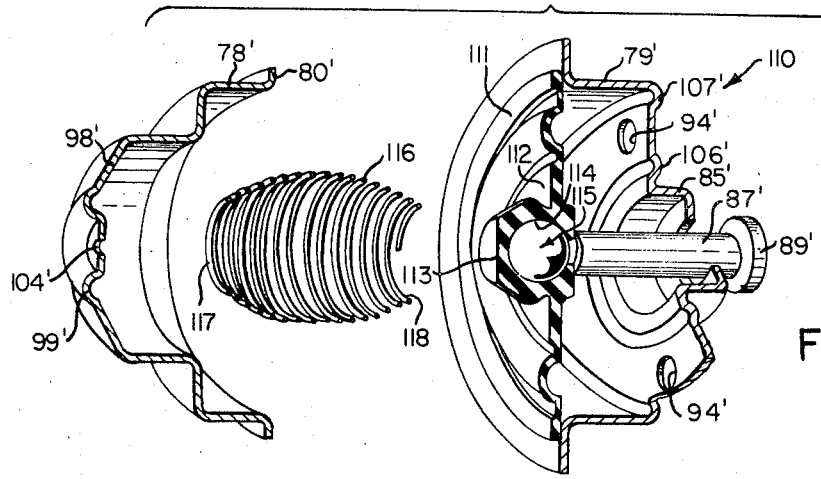

FIGURE 7 is a view similar to FIGURE 5 illustrating another embodiment of the pressure regulator of this invention.

Figure 8:
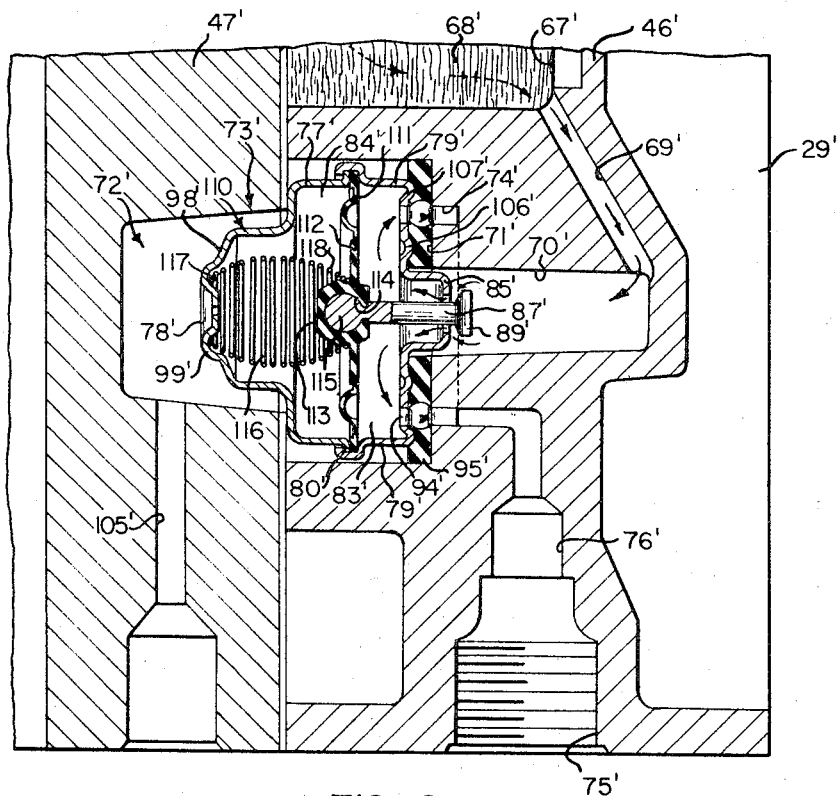

FIGURE 8 is a view similar to FIGURE 6 illustrating the use of the pressure regulator of FIGURE 7.

While the various features of this invention are hereinafter described and illustrated as being particularly adaptable for forming a control device for a domestic water heater tank or the like, it is to be understood that the various features of this invention can be utilized singly or in any combination thereof to provide other constructions as desired.

Therefore, this invention is not to be limited to only the embodiment illustrated in the drawings, because the drawings are merely utilized to illustrate one of the wide variety of uses of this invention.

Referring now to FIGURES 1 and 2, the improved control device of this invention is generally indicated by the reference numeral 20 and is adapted to maintain the temperature of the water contained in a water heater tank 21 at a selected temperature regardless of the amount of hot water drawn therefrom.

In particular, the control device 20 is interconnected to a source of fuel by the inlet conduit 22 and is adapted to interconnect the inlet conduit 22 to an outlet conduit 23 leading to a main burner means 24 for heating the tank 21. The control device 20 is also adapted to interconnect the inlet conduit 22 to an outlet conduit 25 leading to a pilot burner means 26 utilized to ignite fuel issuing from the main burner means 24 in a manner hereinafter described.

The general operation of the control device 20 will now be described and reference is made to FIGURES 3 and 4.

When the water heater system of this invention is initially installed, a control knob 27 of the control device 20 is normally disposed in an "off" position thereof, whereby a cock valve 28 disposed in a housing 29 of the control device 20 is disposed in such a position that communication between a chamber 30 of the housing 29 and a pair of passages 31 and 32, respectively leading to the conduits 25 and 23 in a manner hereinafter described, is prevented.

The chamber 30 of the housing 29 is separated from an inlet chamber 33 by an annular valve seat 34, the inlet chamber 33 being in direct communication with the fuel inlet conduit 22.

A valve member 35, carried on a rod or shaft 36, is normally seated against the valve seat 34 by a spring 37 to prevent communication between the chambers 30 and 33, the rod 36 being adapted to be pushed downwardly to open the valve seat 34 by a button type plunger 38. The other end of the rod 36 is interconnected to suitable structure (not shown) which will hold the valve member 35 in the opened position as illustrated in FIGURE 3 as long as a sensing member 39, FIGURE 1, senses a flame at the pilot burner means 26.

However, should the flame at the pilot burner means 26 be extinguished, the valve member 35 is returned to the closed position thereof in a conventional manner to prevent communication between the chambers 33 and 30 so that fuel cannot issue from the main burner means 24 as well as the pilot burner means 26 when no flame exists at the pilot burner means 26 to ignite the main burner means 24.

To actuate the water heater system of this invention, the control knob 27 is first rotated to a "pilot" position

4 thereof whereby fuel is adapted to flow from the chamber 30 into a passage 40 leading to a passage 41 that is interconnected to the passage 31 by a groove 42 in the gas cock 28 in the manner illustrated in FIGURE 3, the gas cock 28 only being adapted to interconnect the chamber 30 with the pilot passage 31 and not with the main burner passage 32 when the control knob 27 is disposed in the "pilot" position thereof.

With the control knob 27 disposed in the "pilot" position thereof, the button 38 is manually pressed downwardly to manually open the valve member 35 whereby fuel can issue from the pilot burner means 26 and may be ignited either manually or automatically as desired.

When a flame appears at the pilot burner means 26, the sensing means 39 senses the flame at the pilot burner means 26 and maintains the valve member 35 in the opened position as illustrated in FIGURE 3.

After the pilot burner means 26 has been ignited and the valve member 35 is held in the opened position thereof, the control knob 27 is rotated to the "on" position thereof as illustrated in FIGURE 3 whereby a passage 43 of the gas cock 28 interconnects the chamber 30 with the passage 32 leading to the main burner means 24 in a manner hereinafter described.

In the particular embodiment of the control device 20 of this invention illustrated in the drawings, a pressure regulator 44, FIGURE 4, is provided for the main burner means 24 and will now be described. However, it is to be understood that the various features of this invention can be utilized without the pressure regulator 44 for the main burner means 24, as desired.

As illustrated in FIGURE 4, the housing 29 of the control device 20 is formed of two end housing sections 45 and 46 and a central housing section 47 suitably bolted together in a manner conventional in the art.

The passage 32 leading from the gas cock 28 is formed in the housing sections 46 and 47 and communicates with an annular valve seat 48 formed in the housing section 47, the valve seat 48 leading to a compartment 49 formed in the housing sections 45 and 47.

The compartment 49 of the housing 29 is divided into two chambers 50 and 51 by a flexible diaphragm 52 secured between the housing sections 45 and 47, the diaphragm 52 carrying a valve member 53 cooperating with the valve seat 48 to control the flow of fuel from the passage 32 into the chamber 50.

The valve member 53 is normally urged to the open position thereof by a lever 54 spring biased to the right by any of the means fully set forth in the copending patent application, Ser. No. 862,694, filed Dec. 29, 1959, and entitled "Control Devices" now abandoned and assigned to the assignee of this application.

In this manner, the pressure of the fuel flowing through the chamber 50 of the housing 29 is regulated by the pressure regulator 44, the setting of the pressure regulator 44 being manual or automatic in any of the manners set forth in the aforementioned copending patent application.

A passage 55 leads from the chamber 50 to an annular valve seat 56 formed in the housing section 46, the annular valve seat 56 leading to an outlet passage 57 adapted to be interconnected to the outlet conduit 23 previously described and leading to the main burner means 24.

A valve means 58 is carried by the housing 29 and is adapted to cooperate with the valve seat 56 to control the flow of fuel to the main burner means 24.

The fuel is only adapted to pass through the valve means 58 in a manner hereinafter described when a water temperature sensing means or thermostat 59, FIGURES 2 and 4, determines that the temperature of the water in the tank 21 has fallen below a temperature selected by a control means 60 disposed in an openable compartment of the control device 20.

The temperature sensing or thermostat means 59 comprises a conventional tube 61 and rod 62 arrangement, the tube 61 and rod 62 being disposed in the interior of the tank 21 in such a manner that the end 63 of the tube 61 is fixed relative to the tank 21 and the other end 64 thereof is free for movement relative to the tank 21.

The rod 62 has an end 65 secured to the free end 64 of the tube 61 and is formed of a material having a lower coefficient of thermal expansion than the tube 61 whereby the free end 66 of the rod 62 is moved to the left as illustrated in FIGURE 4 when there is a decrease in temperature of the tank 21 because the tube 61 contracts. Conversely, the end 66 of the rod 62 is moved to the right as illustrated in FIGURE 4 when the temperature in the tank 21 increases because the tube 61 expands.

In this manner, the thermostatic means 59, after the pilot burner means 26 has been ignited and the control knob 27 is disposed in the "on" position thereof, opens the valve means 58 in a manner fully described in the aforementioned copending application to allow fuel to issue to the main burner means 24 when the temperature of the water in the tank 21 has fallen below a selected temperature so that the main burner means 24 will heat the water in the tank 21 to the temperature selected by the control means 60 in a manner conventional in the art.

When the temperature of the water in the tank 21 has reached the desired temperature level, the thermostatic means 59 permits the valve means 58 to close so that no fuel issues from the main burner means 24 until the temperature of the water in the tank 21 falls below the selected temperature.

Thus, it can be seen that the main burner means 24 is intermittently operated by the thermostatic means 59 to maintain the water in the tank 21 at a selected temperature regardless of the amount of hot water drawn from the tank 21, the fuel issuing to the main burner means 24 being maintained at a substantially constant rate by the pressure regulator 44 in the manner fully described in the aforementioned copending application.

While one type of general control system for heating the water tank has been described, it is to be understood that such a system is merely emblematic of the many different types of system to which the following features of this invention can be utilized.

The particular details of the control device 20 will now be described in connection with the separate pressure regulation of the flow of gas to the pilot burner means 26.

As illustrated in FIGURE 3, the pilot flow passage 31 is interconnected to a chamber 67 formed in the housing 29 and having a suitable filter means 68 disposed therein.

In this manner, fuel flows from the passage 31 into the chamber 67 and through the filter means 68 to a passage 69 leading to an inlet passage 70 formed in the housing 29 as illustrated in FIGURE 6.

The inlet passage 70 interrupts surface 71 of the housing section 46 and is interconnected with a cavity 72 defined between the housing sections 46 and 47, the cavity 72 receiving a pressure regulator 73 of this invention.

The housing section 46 is provided with an annular recess 74 interrupting the surface 71 thereof whereby the annular recess 74 is disposed concentrically about the inlet passage means 70 and is disposed in communication with the cavity 72. The annular recess 74 is disposed in communication with an outlet port 75 by a passage means 76 formed in the housing section 46, the outlet port 75 being interconnected to the outlet conduit 25 leading to the pilot burner means 26.

Thus, it can be seen that the fuel flowing from the source conduit 22 to the pilot burner means 26 must first pass through the pressure regulator 73 of this invention whereby the pressure regulator 73 maintains the fuel flowing to the pilot burner means 26 at a substantially constant pressure regardless of the pressure regulation of the fuel flowing to the main burner means 24. Thus, it can be seen that the pressure regulation of the pilot burner means 26 is independent of the fluctuations of the input gas pressure as well as of the operation and pressure regulation of the main burner means 24.

The pressure regulator 74 as illustrated in FIGURES 5 and 6, comprises a hollow casing 77 formed from two-cup-shaped extruded metal members 78 and 79 suitably interconnected together.

For example, the casing member 78 can have an outwardly directed annular flange 80 at the opened end thereof and the casing member 79 can have an outwardly directed annular flange 81 at the open end thereof that is adapted to be crimped around the annular flange 80 of the casing member 78 to secure the casing members 78 and 79 together in the manner illustrated in FIGURE 6, the annular flanges 80 and 81 of the casing members 78 and 79 cooperating together to sandwich an outer peripheral edge of a resilient diaphragm member 82 therebetween whereby the diaphragm 82 divides the casing 77 of the pressure regulator 73 into two chambers 83 and 84.

The casing member 79 has an outwardly directed central portion 85 provided with an aperture 86 passing therethrough and adapted to interconnect the inlet passage means 70 of the housing 29 with the chamber 83 thereof, the aperture 86 also providing a valve seat for a valve member 87 having one end 88 thereof interconnected to the diaphragm 82 and the other enlarged end 89 thereof projecting through the aperture 86 to control the flow of fuel through the valve seat 86 in relation to the position of the diaphragm 82.

For example, the end 88 of the valve member 87 can be provided with an annular shoulder 90 adapted to abut one side of the diaphragm 82 with the remaining portion of the end 88 thereof passing through a suitable aperture 91 formed in the diaphragm 82 and an aperture 92 formed in a metal retaining plate 93 disposed against the other side of the diaphragm 82.

After the end 88 of the valve member 87 has passed through the apertures 91 and 92 of the diaphragm 82 and retainer plate 93, the end 83 of the valve member 87 can be peened over and not only secure the valve member 87 to the diaphragm 82 but also secure the retaining plate 93 to the diaphragm 82.

The casing member 79 of the pressure regulator 73 is provided with a pair of diametrically opposed outlet openings 94 adapted to register with the annular recess 74 of the housing section 46 when the pressure regulator 73 is disposed in the cavity 72 in the position illustrated in FIGURE 6.

A suitable resilient gasket 95 is adapted to be disposed between the surface 71 of the housing section 46 and the pressure regulator 73 in the manner illustrated in FIGURE 6, the gasket 95 having a central aperture 96 formed therethrough to telescopically receive the central projection 85 of the pressure regulator 73.

The gasket 95 has a plurality of circumferentially disposed, arcuate slots 97 passing therethrough and arranged in such a manner that regardless of the rotational position of the gasket 78 relative to the pressure regulator 73, at least one of the outlet openings 94 in the pressure regulator 73 will register with one of the slots 97 to interconnect that particular outlet opening 94 with the annular recess 74 of the housing section 46 so that the chamber 83 of the pressure regulator 73 is always disposed in communication with the outlet conduit 25 leading to the pilot burner means 26.

In this manner, it can be seen that the pressure regulator 73 and gasket 95 can be disposed in the cavity 72 of the housing 29 in any rotational positions thereof and still provide communication between the pressure regulator 73 and the outlet conduit 25.

The casing member 78 of the pressure regulator 73 is provided with a substantially domed end 98 having annular recess or groove 99 formed in the inside surface thereof to receive and position an end 100 of a compression spring 101 disposed in the chamber 84, the other end 102 of the compression spring 101 bearing against the retaining plate 93 between outwardly directed guide abutments 103 stamped from the retaining plate 93.

In this manner the force of the compression spring 101 tends to move the diaphragm 82 to the right as illustrated in FIGURE 6 to open the valve member 87 and permit fuel to flow from the inlet passage 70 into the chamber 83 of the pressure regulator 73 and out through the outlet openings 94 to the pilot burner means 26.

However, as the pressure of the fuel in the chamber 83 builds up, the same acts against the diaphragm 82 to tend to push the the same to the left in opposition to the force of the compression spring 101 whereby when the force of the pressure in the chamber 83 of the pressure regulator 73 exceeds the force of the compression spring 101, the valve member 87 is moved to a closed position thereof.

Thus, it can be seen that the pressure regulator 73 operates in such a manner that the valve member 87 maintains a constant pressure in the chamber 83 of the pressure regulator 73 regardless of the pressure of the fuel entering through the inlet conduit 22. Thus, the pressure regulator 73 maintains a flow of fuel to the pilot burner means 26 at a constant pressure independent of the operation of the control device 20 in regards to the main burner means 24 as well as to the variations in the inlet gas pressure.

The chamber 84 of the pressure regulator 73 is interconnected to the atmosphere by having a vent opening 104 formed in the domed end 98 of the casing member 78 and disposed in communication with a passage means 105 formed in the central housing section 47 and interconnected to the exterior thereof in any suitable manner.

In this manner, no air will be trapped in the chamber 84 of the pressure regulator 73 to impede movement of the diaphragm 82.

When the pressure regulator 73 is first manufactured, the domed end 98 of the casing member 78 is so constructed and arranged that the force of the compression spring 101 is adapted to maintain the flow of fuel through the pressure regulator 73 at a minimum constant pressure for providing a flame at the pilot burner means 26.

Thus, during manufacture of the pressure regulator 73, tolerances need not be maintained at a costly rate because the pressure regulator manufacturer can readily adjust a particular pressure regulator 73 to the desired setting thereof by merely inwardly deforming the domed end 98 of the casing member 78 in the manner illustrated in dotted lines in FIGURE 6 to increase the force of the compression spring 101 to set the pressure regulator 73 at the desired pressure setting thereof, the domed end 98 of the pressure regulator 73 being permanently deformed in the desired position thereof.

Should it be found that during the inwardly depressing operations of the domed end 98 of the pressure regulator 73, the force of the compression spring 101 is increased to too great an extent, the domed end 98 of the pressure regulator 73 can be pulled outwardly by merely inserting a tool in the vent opening 104 thereof and pulling outwardly to the desired extent.

Therefore, it can be seen that the pressure regulator 73 of this invention can be readily adjusted to the desired pressure setting thereof without requiring costly threaded adjusting members as in the prior art whereby the overall cost of the pressure regulator 73 of this invention can be held at a minimum.

When the pressure regulator 73 is assembled in the control device 20, the pressure regulator 73 is of such a size relative to the cavity 72 that when the central housing section is bolted to the housing section 46, the central housing section 47 compresses the casing 77 of the pressure regulator 73 against the gasket 95, the casing member 79 of the pressure regulator 73 having outwardly directed, annular, concentrically disposed ribs 106 and 107 disposed on opposite sides of the outlet openings 94 whereby the ribs 106 and 107 in combination with the compressed gasket 95 seal the inlet passage 70 and the outlet openings 94 from the cavity 72 of the housing 29 to prevent fuel leakage through the pressure regulator 73.

Therefore, it can be seen that the pressure regulator of this invention cannot only be simply and inexpensively manufactured while still permitting adjustment thereof, but also the pressure regulator of this invention is readily adapted to maintain a flow of fuel to a pilot burner means of a water heating system or the like at a substantially constant pressure regardless of the pressure value of the source of fuel and regardless of the operation of the flow of fuel to the main burner of the system without requiring pilot burner adjustments as in prior known control devices.

Reference is now made to FIGURES 7 and 8 wherein another pressure regulator of this invention is generally indicated by the reference numeral 110 and the parts thereof similar to the parts of the pressure regulator 73 are indicated by like reference numerals followed by a prime mark.

As illustrated in FIGURE 7, the pressure regulator includes the cup-shaped housings 78' and 79' formed in the manner previously described and for the same purpose.

However, the flexible diaphragm 111 of the pressure regulator 110 has a thickened central portion 112 which eliminates the need for the back-up member 93 previously described.

In addition, the diaphragm 111 has a centrally disposed cup-shaped portion 113 provided with a cavity 114 adapted to have a ball end 115 of the valve member 87' snap-fitted therein to interconnect the valve member 87' to the diaphragm 111 without requiring the expensive peening operation previously described.

The compression spring 116 is substantially egg-shaped to lower the spring rate thereof and has the opposed ends 117 and 118 thereof respectively engaging the cup-shaped member 78' and the thickened portion 112 of the diaphragm 111 to function in the same manner as the spring 101 previously described.

Therefore, it can be seen that the pressure regulator 110 of this invention is simpler to manufacture than the pressure regulator 73, while still having the same spring adjustment features and being adapted to function in the same manner as illustrated in FIGURE 8.

While the form of the invention now preferred has been disclosed as required by the statutes, other forms may be used, all coming within the scope of the claims which follow.

What is claimed is:

1. In combination, a housing having an inlet passage and an outlet passage respectively interrupting a surface means of said housing to form an inlet and an outlet, a self-contained pressure regulator carried by said housing and having a cup-shaped casing provided with an open end and a closed end, said closed end defining a wall provided with an inlet means and with an outlet means, means for providing fluid communication between said inlet and said inlet means and for providing fluid communication between said outlet and said outlet means regardless of the rotational position of said pressure regulator relative to said surface means of said housing comprising sealing gasket means disposed between said casing wall and said surface means, said gasket means having an inlet passageway communicating said inlet with said inlet means and a plurality of arcuate slots arranged such that at least a portion of one of said slots provides communication between said outlet and said outlet means regardless of their relative rotational positions, said pressure regulator carrying a flexible diaphragm cooperating with said casing to define a chamber in fluid communication with said inlet means and said outlet means, said open end of said casing being turned over to secure said diaphragm thereto, in a self-contained manner, and said diaphragm carrying a valve member for opening and closing said inlet means.

2. A combination as set forth in claim 1 wherein said diaphragm cooperates with said housing to define a second chamber, said housing having vent means interconnecting said second chamber to the atmosphere.

3. A combination as set forth in claim 1 wherein a spring means is provided and normally tends to move said diaphragm in a valve member opening direction.

4. A combination as set forth in claim 1 wherein said surface means is flat.

5. A combination as set forth in claim 1 wherein said inlet means comprises a single opening formed centrally in a front wall of said casing.

6. A combination as set forth in claim 5 wherein said outlet means comprises a plurality of openings formed circumferentially in said front wall and about said inlet means.

7. A combination as set forth in claim 1 wherein said housing is formed of two parts, one of said parts carrying said surface means and the other of said parts engaging said casing and forcing said casing into sealing relationship with said surface means.

8. A combination as set forth in claim 1 wherein said outlet is circular and concentrically disposed about said inlet.

9. In combination, a housing having an inlet passage and an outlet passage respectively interrupting a surface means of said housing to form an inlet and an outlet, said outlet being circular and concentrically disposed about said inlet, a self-contained pressure regulator carried by said housing and having a cup-shaped casing provided with an open end and a closed end, said closed end defining a wall provided with an inlet means and with an outlet means, said outlet means comprising a pair of diametrically disposed outlets, means for providing fluid communication between said inlet and said inlet means and for providing fluid communication between said outlet and said outlet means regardless of the rotational position of said pressure regulator relative to said surface means of said housing comprising a gasket disposed between said pressure regulator and said surface means of said housing, said gasket having circularly arranged arcuate slots placed in communication with said housing outlet and in communication with at least one of said pressure regulator outlets regardless of the rotational position of said pressure regulator relative to said housing, said pressure regulator carrying a flexible diaphragm cooperating with said casing to define a chamber in fluid communication with said inlet means and said outlet means, said open end of said casing being turned over to secure said diaphragm thereto, in a self-contained manner, and said diaphragm carrying a valve member for opening and closing said inlet means.

10. A combination as set forth in claim 9 wherein said pressure regulator has a portion thereof disposed in said inlet of said housing, said portion carrying said inlet means of said pressure regulator.

11. A combination as set forth in claim 10 wherein said gasket surrounds said portion of said pressure regulator.

References Cited

UNITED STATES PATENTS

| | | | |
|---|---|---|---|
| 2,534,497 | 12/1950 | Albright | 92—98 XR |
| 2,737,202 | 3/1956 | Baldwin | 137—505.41 |
| 2,843,151 | 7/1958 | Greenawalt | 92—98 XR |
| 1,793,292 | 2/1931 | Taylor | 137—454.6 |
| 2,868,223 | 1/1959 | Lum | 137—454.6 |
| 3,003,519 | 10/1961 | Homeyer | 137—454.6 |
| 3,124,154 | 3/1964 | Kehler | 137—454.4 |
| 3,166,500 | 1/1965 | Noakes | 137—454.6 XR |

HAROLD W. WEAKLEY, *Primary Examiner*

U.S. Cl. X.R.

137—505.41; 267—1